US011518361B2

(12) United States Patent
Tsukamoto et al.

(10) Patent No.: US 11,518,361 B2
(45) Date of Patent: Dec. 6, 2022

(54) ELECTRIC BRAKING DEVICE FOR VEHICLE

(71) Applicant: ADVICS CO., LTD., Kariya (JP)

(72) Inventors: Shun Tsukamoto, Kariya (JP); Shinichiro Yukoku, Seto (JP)

(73) Assignee: ADVICS CO., LTD., Kariya (JP)

( * ) Notice: Subject to any disclaimer, the term of this patent is extended or adjusted under 35 U.S.C. 154(b) by 288 days.

(21) Appl. No.: 16/342,264

(22) PCT Filed: Nov. 7, 2017

(86) PCT No.: PCT/JP2017/040013
§ 371 (c)(1),
(2) Date: Apr. 16, 2019

(87) PCT Pub. No.: WO2018/084303
PCT Pub. Date: May 11, 2018

(65) Prior Publication Data
US 2019/0322265 A1 Oct. 24, 2019

(30) Foreign Application Priority Data

Nov. 7, 2016 (JP) .............................. JP2016-217081

(51) Int. Cl.
*B60T 13/74* (2006.01)
*B60T 17/22* (2006.01)
(Continued)

(52) U.S. Cl.
CPC .......... *B60T 17/221* (2013.01); *B60T 13/746* (2013.01); *F16D 66/00* (2013.01); *B60T 1/065* (2013.01);
(Continued)

(58) Field of Classification Search
CPC ...... B60T 13/743; B60T 13/74; B60T 13/741; B60T 13/746; B60T 2270/406;
(Continued)

(56) References Cited

U.S. PATENT DOCUMENTS

| 4,953,668 | A | * | 9/1990 | Severinsson | ............ F16D 65/28 188/158 |
| 2007/0114843 | A1 | * | 5/2007 | Kawahara | ................. B60T 7/12 303/122 |

(Continued)

FOREIGN PATENT DOCUMENTS

JP    2013024389 A    2/2013

*Primary Examiner* — Bradley T King
*Assistant Examiner* — Stephen M Bowes
(74) *Attorney, Agent, or Firm* — Buchanan Ingersoll & Rooney PC

(57) ABSTRACT

Provided is an electric braking device wherein a friction member is pressed, via a piston driven by an electric motor, against a rotary member that rotates integrally with a vehicle wheel, thus generating a braking force on the vehicle wheel. The electric braking device is provided with: a controller for controlling the electric motor; a rotation angle sensor for detecting a rotation angle of the electric motor; and a return mechanism for applying a return force to a piston in a direction away from the rotary member. Furthermore, the controller executes a proper/improper determination to determine whether the return mechanism is operating properly on the basis of a change in the rotation angle after conduction of electricity to the electric motor is stopped.

2 Claims, 5 Drawing Sheets

(51) Int. Cl.
   *F16D 66/00*    (2006.01)
   *B60T 1/06*     (2006.01)
   *F16D 65/52*    (2006.01)
   *F16D 121/24*   (2012.01)
   *F16D 125/48*   (2012.01)
   *F16D 127/02*   (2012.01)
   *F16D 129/04*   (2012.01)

(52) U.S. Cl.
   CPC .......... *F16D 65/52* (2013.01); *F16D 2121/24* (2013.01); *F16D 2125/48* (2013.01); *F16D 2127/02* (2013.01); *F16D 2129/04* (2013.01)

(58) Field of Classification Search
   CPC .. F16D 2125/40; F16D 2121/24; F16D 65/18; F16D 2066/003; F16D 2066/005; F16D 2127/02
   See application file for complete search history.

(56) References Cited

U.S. PATENT DOCUMENTS

| | | | | |
|---|---|---|---|---|
| 2007/0209901 A1* | 9/2007 | Ehrlich | ................. | F16D 48/064 |
| | | | | 192/84.6 |
| 2015/0027820 A1* | 1/2015 | Park | .................... | F16D 65/0068 |
| | | | | 188/72.1 |
| 2015/0136543 A1* | 5/2015 | Selles | .................... | F16D 65/14 |
| | | | | 188/162 |
| 2017/0321773 A1* | 11/2017 | Lee | ....................... | F16D 55/226 |

\* cited by examiner

ELECTRIC BRAKING DEVICE FOR VEHICLE

TECHNICAL FIELD

The present invention relates to an electric braking device for a vehicle.

BACKGROUND ART

The applicant has been developing, as disclosed in PTL 1, a braking control device (also called an "electric braking device") that generates a braking force at a wheel of a vehicle by using an electric motor, with a fail-safe function. Specifically, the electric braking device is configured to allow a piston to return to the initial position even when the electric motor is unable to be driven in a reverse direction. The electric braking device is provided with a rotation shaft that is supported by a case of an energy accumulating mechanism (also called a "returning mechanism") in a manner integrally rotatable with an output shaft of the electric motor. The rotation shaft is rotated in a forward direction to elastically deform a spiral spring in the energy accumulating mechanism, thereby causing accumulation of elastic energy. Conversely, the rotation shaft is rotated in a reverse direction to release the elastic energy accumulated in the spiral spring, thereby applying torque to the rotation shaft in the reverse direction. Thus, the returning mechanism exhibits the fail-safe function, and it is necessary to monitor whether this function is secured, at any time.

CITATION LIST

Patent Literature

PTL 1: JP-A-2013-024389

SUMMARY OF INVENTION

Technical Problem

An object of the invention is to provide an electric braking device that generates a braking force at a wheel of a vehicle by using an electric motor, with a function for appropriately determining whether a returning mechanism for achieving fail-safe operation operates properly.

Solution to Problem

An electric braking device for a vehicle according to the invention generates a braking force at a wheel (WH) of the vehicle by making a friction member (MS) pressed against a rotation member (KT) that rotates integrally with the wheel (WH), via a piston (PSN) driven by an electric motor (MTR). The electric controlling device for the vehicle includes a controller (CTL) that controls the electric motor (MTR), a rotation angle sensor (MKA) that measures a rotation angle (Mka) of the electric motor (MTR), and a returning mechanism (MDK) that applies a returning force (Frt) to the piston (PSN) in a direction away from the rotation member (KT).

In the electric braking device for the vehicle according to the invention, the controller (CTL) executes determination whether the returning mechanism (MDK) operates properly, on the basis of change (Trt, dMkm) in the rotation angle (Mka) after supply of electricity to the electric motor (MTR) is stopped.

An electric braking device for a vehicle according to the invention includes a controller (CTL) that controls the electric motor (MTR), a pressing force sensor (FPA) that measures a pressing force (Fpa) of the piston (PSN) against the friction member (MS), and a returning mechanism (MDK) that applies a returning force (Frt) to the piston (PSN) in a direction away from the rotation member (KT).

In the electric braking device for the vehicle according to the invention, the controller (CTL) executes determination whether the returning mechanism (MDK) operates properly, on the basis of change (Trs, dFpm) in the pressing force (Fpa) after supply of electricity to the electric motor (MTR) is stopped.

The returning mechanism MDK can malfunction due to causes such as damage to a spring (an elastic body) SPR and increase in friction. In this situation, in the above-described structures, the proper/improper determination of operation of the returning mechanism MDK is performed by using a measured value of a sensor that is already provided to the electric braking device DDS. This eliminates the need to add a new structural component for the proper/improper determination. As a result, a decrease in dimensions and weight is achieved, and the fail-safe function of the returning mechanism MDK is reliably checked, without having to complicate the electric braking device DDS.

DESCRIPTION OF EMBODIMENTS

<Whole Configuration of Electric Braking Device for Vehicle According to Invention>

Figure 1:
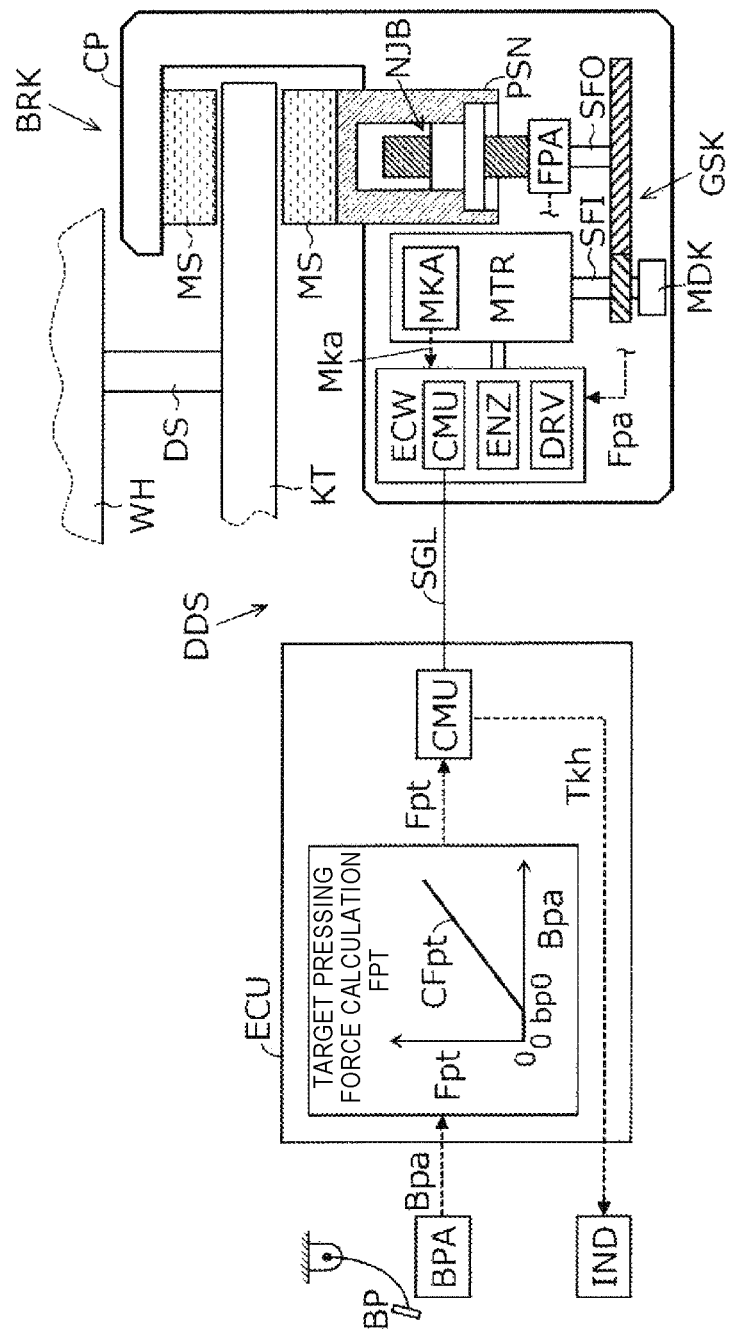
FIG. 1 is a whole configuration diagram of a vehicle equipped with an electric braking device DDS for a vehicle according to the invention.

An electric braking device DDS according to an embodiment of the invention will be described with reference to the whole configuration diagram in FIG. 1. In the following descriptions, structural members, arithmetic processes, signals, characteristics, and values that are added with the same symbols exhibit the same functions. Accordingly, descriptions thereof may not be repeated in some cases.

The electric braking device DDS is provided to a vehicle that includes a brake operation member BP, an operation amount sensor BPA, a vehicle body-side controller ECU, a brake actuator BRK, a communication line SGL, and a notification unit (indicator) IND. Moreover, the vehicle includes wheels WH each having a brake caliper CP, a rotation member KT, and a friction member MS.

The brake operation member (for example, brake pedal) BP is operated by a driver to decelerate the vehicle. The brake operation member BP is operated to adjust a braking torque for the wheel WH, thereby generating a braking force at the wheel WH. In more detail, the rotation member KT is fixed to the wheel WH of the vehicle. The brake caliper CP is arranged so as to surround the rotation member (for example, brake disc) KT. In these conditions, two friction members (for example, brake pads) MS of the brake caliper (also simply called a "caliper") CP are pressed against the rotation member KT by means of power of an electric motor MTR. At that time, a frictional force is generated, and, as the rotation member KT and the wheel WH are fixed together so as to rotate integrally, the frictional force applies a braking torque to the wheel WH, thereby causing generation of a braking force.

The brake operation member (brake pedal) BP is provided with the brake operation amount sensor BPA. The brake operation amount sensor BPA measures an operation amount (brake operation amount) Bpa of the brake operation member BP operated by a driver. The brake operation amount sensor BPA uses one or more among a sensor (pressure sensor) that measures pressure of a master cylinder, a sensor (pressing-down force sensor) that measures an operation force applied to the brake operation member BP, and a sensor (stroke sensor) that measures displacement of the brake operation member BP due to operation. Thus, the brake operation amount Bpa is calculated on the basis of one or more among a master cylinder pressure, a brake pedal pressing-down force, and a brake pedal stroke. The brake operation amount Bpa is input to the vehicle body-side controller ECU.

<<Vehicle Body-Side Controller ECU>>

The vehicle body-side controller (also called a "vehicle body-side electronic control unit") ECU is provided to a vehicle body of the vehicle. The vehicle body-side controller ECU includes an electric circuit having a microprocessor and is fixed to the vehicle body. The vehicle body-side controller ECU includes a target pressing force calculation block FPT and a vehicle body-side communication unit CMU. The target pressing force calculation block FPT and the communication unit CMU are control algorithms and are programmed in the microprocessor of the vehicle body-side controller ECU. The vehicle body-side controller ECU corresponds to a part of the controller CTL.

The target pressing force calculation block FPT calculates a target pressing force (target value) Fpt on the basis of the brake operation amount Bpa. The target pressing force Fpt is a target value of a force (pressing force) of the friction member MS for pressing the rotation member KT. The target pressing force Fpt is calculated on the basis of the brake operation amount Bpa and a predetermined arithmetic characteristic (arithmetic map) CFpt.

The arithmetic characteristic CFpt specifies the target pressing force Fpt so that the target pressing force Fpt will be calculated to be "0" in the condition in which the brake operation amount Bpa is in a range of "0" to a value bp0. In the case in which the operation amount Bpa exceeds the value bp0, the target pressing force Fpt is calculated so as to monotonously increase with an increase in the operation amount Bpa. The value bp0 is a preliminarily set specific value that corresponds to a "free play (freely movable amount between structural components)" of the brake operation member BP and is called a "free play value".

The target pressing force Fpt that is calculated by the target pressing force calculation block FPT is output to the communication unit CMU. The vehicle body-side communication unit CMU is connected to the communication line SGL to transmit and receive (send and receive) a data signal to and from a wheel-side communication unit CMU of a wheel-side controller ECW. The above describes the vehicle body-side controller ECU.

<<Brake Actuator BRK>>

Next, the brake actuator BRK will be described. The brake actuator (simply called an "actuator") BRK makes the friction member MS pressed against the rotation member KT that rotates integrally with the wheel. A frictional force is resultantly generated, and the actuator BRK applies a braking torque to the wheel WH to generate a braking force by using this frictional force, thereby decelerating the vehicle in traveling. An example of using a structure of a so-called floating disc brake (floating caliper) in the actuator BRK is illustrated.

The actuator BRK includes the brake caliper CP, a pressing piston PSN, the electric motor MTR, a rotation angle sensor MKA, a speed reducer GSK, an input shaft SFI, an output shaft SFO, a screw member NJB, a pressing force sensor FPA, a wheel-side controller ECW, and a returning mechanism MDK.

The brake caliper (also simply called a "caliper") CP is structured so as to surround the (brake disc) KT via the two friction members (brake pads) MS. The caliper CP houses the pressing piston (also simply called a "piston") PSN that moves (forward or backward) relative to the rotation member KT.

The piston PSN moves to make the friction member MS pressed against the rotation member KT, thereby generating a frictional force. The piston PSN is moved by power of the electric motor MTR. In more detail, an output shaft of the electric motor MTR is fixed with the input shaft SFI. Thus, output (rotation force around an axis) of the electric motor MTR is input to the input shaft SFI.

The input shaft SFI is fixed with a small-diameter gear. The small-diameter gear engages with a large-diameter gear and thereby constitutes the speed reducer GSK. The large-diameter gear is fixed with the output shaft SFO. Thus, the power of the electric motor MTR is transmitted from the input shaft SFI to the output shaft SFO via the speed reducer GSK.

The rotation power (torque) of the output shaft SFO is converted into a linear power (thrust in a center axis direction of the piston PSN) by the screw member NJB. The screw member NJB and the piston PSN are fixed in a relatively movable manner. Thus, the rotation power is transmitted to the piston PSN. As a result, the piston PSN moves relative to the rotation member KT.

The force (pressing force) of the friction member MS for pressing the rotation member KT is adjusted by moving the piston PSN. As the rotation member KT is fixed to the wheel, the friction member MS and the rotation member KT generate a frictional force therebetween, and the braking force to the wheel is adjusted.

The electric motor MTR is a power source for driving (moving) the piston PSN. For example, the electric motor MTR uses a motor with a brush. A forward rotation direction Fwd of the electric motor MTR corresponds to a direction in which the friction member MS approaches the rotation member KT (that is, a direction in which the pressing force increases, and thus, the braking torque increases). Conversely, a reverse rotation direction Rvs of the electric motor MTR corresponds to a direction in which the friction member MS is separated from the rotation member KT (that is, a direction in which the pressing force decreases, and thus, the braking torque decreases).

In addition, a forward direction of movement of the pressing piston PSN corresponds to the forward rotation direction Fwd of the electric motor MTR and to the direction in which the pressing force Fpa increases. A backward direction of movement of the piston PSN corresponds to the reverse rotation direction Rvs of the electric motor MTR and to the direction in which the pressing force Fpa decreases.

The rotation angle sensor MKA measures a position (that is, rotation angle) Mka of a rotor (rotator) of the electric motor MTR. The measured rotation angle Mka is input to the wheel-side controller ECW.

The pressing force sensor FPA measures an actual force (pressing force) Fpa of the piston PSN for pressing the friction member MS. The measured actual pressing force (measured value of the pressing force) Fpa is input to the wheel-side controller ECW. For example, the pressing force sensor FPA is provided between the output shaft SFO and the caliper CP.

The wheel-side controller ECW (also called a "wheel-side electronic control unit) is disposed (fixed) in the caliper CP. The wheel-side controller ECW includes the communication unit CMU, an arithmetic unit ENZ, and a drive unit DRV. The wheel-side controller ECW is a part of the controller CTL. Thus, the controller CTL includes the vehicle body-side controller ECU and the wheel-side controller ECW.

The wheel-side controller ECW is an electric circuit that drives the electric motor MTR. The wheel-side controller ECW drives the electric motor MTR on the basis of the target pressing force Fpt and controls the output (rotation speed and torque) of the electric motor MTR. The target pressing force Fpt is transmitted from the vehicle body-side controller ECU to the wheel-side controller ECW via the communication line (also called a "signal line") SGL.

The wheel-side communication unit CMU is connected to the communication line SGL to transmit and receive a data signal to and from the vehicle body-side communication unit CMU of the vehicle body-side controller ECU. The arithmetic unit ENZ calculates drive signals Sw1 to Sw4 that control switching elements SW1 to SW4 for driving the electric motor MTR.

The drive unit (drive circuit) DRV has a bridge circuit BRG that includes the four switching elements SW1 to SW4. The bridge circuit BRG performs switching of supply of electricity to the switching elements SW1 to SW4, on the basis of the drive signals Sw1 to Sw4. This switching causes the electric motor MTR to be rotationally driven and the output of the electric motor MTR to be adjusted.

Furthermore, the arithmetic unit ENZ of the wheel-side controller ECW determines whether the returning mechanism MDK operates properly, on the basis of the rotation angle Mka and the pressing force Fpa. In the case in which the returning mechanism MDK is determined as malfunctioning, a notification signal Tkh representing the malfunction is sent to the vehicle body-side controller ECU. Otherwise, in the case in which the returning mechanism MDK is determined as operating appropriately, the notification signal Tkh is not generated.

The returning mechanism MDK stops supply of electricity to the electric motor MTR to release the press contact between the friction member MS and the rotation member KT (that is, the pressing force Fpa is released to "0"). While the electric motor MTR is driven in the forward rotation direction Fwd, elastic energy accumulates in the returning mechanism MDK. This elastic energy makes the electric motor MTR rotate in the reverse rotation direction Rvs in the condition in which the electric motor MTR is not supplied with electricity. As a result, the piston PSN is moved in the backward direction, and the friction member MS is moved in a direction away from the rotation member KT. Thus, even when electricity is not supplied to the electric motor MTR, the pressing state of the friction member MS against the rotation member KT is released by the returning mechanism MDK. The above describes the brake actuator BRK.

The communication line SGL is a communication means between the vehicle body-side controller ECU and the wheel-side controller ECW. The communication line SGL enables the vehicle body-side controller ECU and the wheel-side controller ECW to transmit (receive and send) a data signal therebetween. The communication line SGL uses a serial communication bus. The serial communication bus is a communication method by which data is sent in series by each 1 bit in one communication path. For example, the serial communication bus uses a CAN bus.

The notification unit (indicator) IND notifies a driver of result of determination whether the returning mechanism MDK operates properly, on the basis of the notification signal Tkh. Specifically, in the case in which the returning mechanism MDK operates properly, the indicator IND does not notify the result. Otherwise, in the case in which the returning mechanism MDK is determined as malfunctioning, the indicator IND notifies a driver of this determination. The notification is performed by using sound, light, or other means.

<Returning Mechanism MDK>

Figure 2:
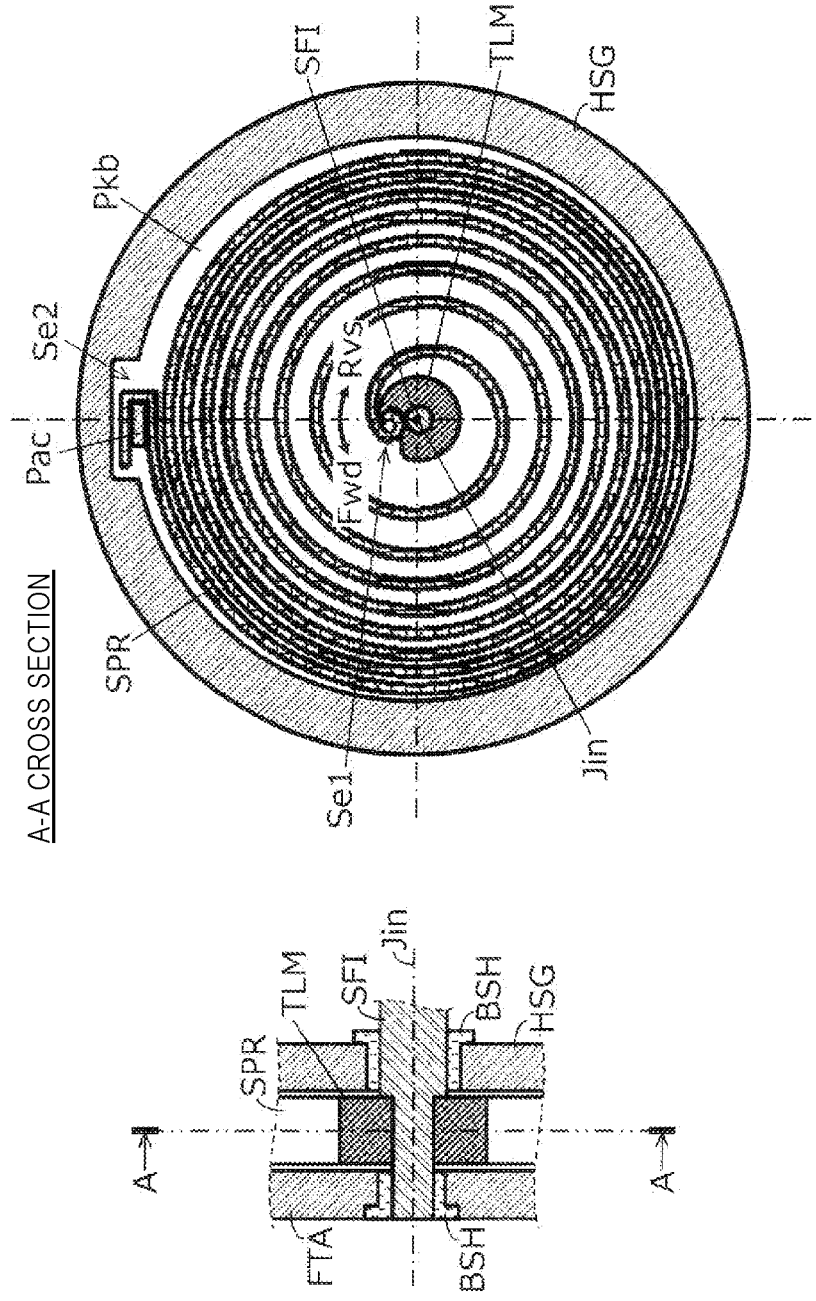
FIG. 2 is a schematic diagram for explaining a returning mechanism MDK.

An example of the returning mechanism MDK will be described with reference to the schematic diagram in FIG. 2. The returning mechanism MDK applies a returning force (spring force) Frt to the piston PSN in the direction away from the rotation member KT (which is the backward direction and corresponds to the reverse rotation direction Rvs of the electric motor MTR). Thus, when the supply of electricity to the electric motor MTR is stopped, the piston PSN is let to return to at least the initial position. The initial position of the piston PSN corresponds to a position at which a clearance between the rotation member KT and the friction member MS is approximately zero, and at which the pressing state between the rotation member KT and the friction member MS is released first when the friction member MS is separated from the rotation member KT.

The returning operation of the piston PSN to the initial position is necessary also when the supply of electricity to the electric braking device DDS is stopped, as a fail-safe function. In view of this, it is made so that the return of the piston PSN to the initial position will be achieved by means of the elastic energy accumulated in the returning mechanism MDK.

The initial position of the piston PSN varies depending on wear of the friction member MS. Specifically, as the amount of wear of the friction member MS increases, the initial position moves accordingly in the forward direction (corresponding to the forward rotation direction Fwd of the electric motor MTR). If no mechanism for compensating the wear of the friction member MS is provided to the returning mechanism MDK, elastic energy to be accumulated in the returning mechanism MDK gradually decreases with increase in the wear of the friction member MS. From this point of view, a wear compensating mechanism is necessary for the returning mechanism MDK to accumulate elastic energy at an approximately constant level at any time.

The returning mechanism MDK includes a spiral spring (elastic body) SPR, a torque limiter TLM, and a housing HSG.

The spiral spring SPR is a mechanical component of a highly elastic material that is spirally wound. The spiral spring SPR generates a force (an elastic force) for returning to the original state from the wound state. The spiral spring is also called a "power spring".

The torque limiter TLM is a mechanical component that shuts off, when an excessive load (for example, torque) is generated, transmission of the torque. The torque limiter is also called a "safety clutch". The torque limiter TLM is provided to the input shaft SFI on a side opposite to the electric motor MTR.

The torque limiter TLM enables the wear compensation of the friction member MS. That is, the torque limiter TLM limits the torque to maintain the elastic energy to be accumulated in the returning mechanism MDK at an approximately constant level. The torque limitation of the torque limiter TLM is effective in the forward rotation direction Fwd and is ineffective in the reverse rotation direction Rvs. That is, the input shaft SFI and the torque limiter TLM rotate integrally at any time in the reverse rotation direction Rvs.

The torque limiter TLM utilizes frictional resistance to suppress an excessive torque. For example, the torque limiter TLM has a center member that is pressurized by a disc spring while being held between friction plates. In the condition in which the torque is equal to or smaller than a set torque (predetermined specific torque), a frictional force between the center member and the friction plate enables transmission of rotation movement. In the condition in which the transmitted torque is greater than the set torque, the center member and the friction plate slide on each other, thereby suppressing transmission of the excessive torque. After the overloaded state is released, the slide stops, and the torque limiter TLM automatically returns to the torque transmittable state.

Thus, the input shaft SFI and the torque limiter TLM rotate integrally in the forward rotation direction Fwd until torque of the input shaft SFI reaches the set specific torque. This causes accumulation of the elastic energy in the spiral spring SPR due to winding up of the spiral spring SPR accompanying rotation of the input shaft SFI, until the transmission torque of the input shaft SFI reaches the specific torque. After the transmission torque of the input shaft SFI reaches the specific torque, slide occurs in the torque limiter TLM, which restricts further winding up of the spiral spring SPR and enables maintaining the elastic energy of the spiral spring SPR at an approximately constant level. The specific torque is a specific value that is mechanically set in advance.

The housing HSG is a bottomed cylindrical member with a recess Pkb for housing the spiral spring SPR. The bottom of the housing HSG is provided with a through hole for the input shaft SFI. The input shaft SFI engages with an end part of the output shaft of the electric motor MTR and is supported by a bush BSH to pass through the through hole of the recess Pkb. The input shaft SFI is fixed with the torque limiter TLM in the housing HSG. An end of the input shaft SFI is supported by the bush BSH, which is provided to a closing member FTA. The closing member FTA is fixed to the housing HSG so as to close the recess Pkb and to form a housing space for the spiral spring SPR.

<<Locking State of Spiral Spring SPR>>

Locking states of the spiral spring SPR relative to the torque limiter TLM and to the housing HSG will be described with reference to an A-A cross section.

First, a locking state of the spiral spring SPR relative to the torque limiter TLM is described. The spiral spring SPR is locked to the input shaft SFI via the torque limiter TLM at an end Se1 at one side on an inner circumferential side. In more detail, the one end Se1 is formed with a locking part having an outer circumferential surface of the spiral spring SPR that is inwardly rolled (that is, having an inner circumferential surface that is rolled back), at a right angle in a longitudinal direction. The torque limiter TLM is provided with a cut section having a semicircular cross section, at an outer circumferential part, to allow the locking part of the spiral spring SPR to lock thereto. When the input shaft SFI is rotated in the forward rotation direction Fwd, the locking part of the one end Se1 is hooked at the cut section of the torque limiter TLM. The one end Se1 of the spiral spring SPR is secured to the outer circumferential part of the torque limiter TLM by the locking part and the cut section, and the spiral spring SPR is then wound.

On the other hand, when the torque limiter TLM is rotated in the reverse rotation direction Rvs, the locking part of the one end Se1 is not hooked at the cut section of the torque limiter TLM. When the input shaft SFI is rotated in the reverse rotation direction Rvs integrally with the torque limiter TLM in the condition in which the locking part of the one end Se1 is hooked at the cut section of the torque limiter TLM, the locking part is unhooked from the cut section, and the spiral spring SPR is unlocked from the cut section, at the time the wound state of the spiral spring SPR is released. That is, the engagement between the spiral spring SPR and the torque limiter TLM has a directional property: the locking part of the one end Se1 and the cut section of the torque limiter TLM "engage with each other in the forward rotation direction Fwd and do not engage with each other in the reverse rotation direction Rvs".

Next, a locking state of the spiral spring SPR relative to the housing HSG is described. The spiral spring SPR has an end Se2 at the other side on an outer circumferential side. The other end Se2 is formed with a U-shaped folded part having an outer circumferential surface of the spiral spring SPR that is folded back over itself (that is, having an inner circumferential surface that is folded back to face outward), at a right angle in the longitudinal direction. The other end Se2 is positioned on a side opposite to the one end Se1 in the longitudinal direction of the spiral spring SPR.

The housing HSG is formed with an anchor part Pac with a rectangular cross section on the inner circumferential side of the recess Pkb. The anchor part Pac extends from the bottom of the housing HSG in parallel to a rotation shaft Jin of the input shaft SFI. The folded part of the other end Se2 is hooked at the anchor part Pac, whereby the spiral spring SPR is secured relative to the housing HSG (that is, relative rotation to the housing HSG is inhibited). The above describes the locking state of the spiral spring SPR.

<<Movement of Returning Mechanism MDK>>

Movement of the returning mechanism MDK will be described. When the electric motor MTR is driven in the forward rotation direction Fwd to increase the braking torque, the input shaft SFI that is fixed to the output shaft of the electric motor MTR is also rotated in the forward rotation direction Fwd (in a counter clockwise direction in FIG. 2). Thus, the spiral spring SPR is wound around the input shaft SFI, and the returning mechanism MDK accumulates elastic energy. When torque in the forward rotation direction Fwd of the input shaft SFI reaches the specific torque, the returning mechanism MDK accumulates a specific amount of elastic energy. The accumulated elastic energy applies the returning force Frt to the piston PSN in the direction away from the rotation member KT (that is, in the backward direction).

When the torque in the forward rotation direction Fwd of the input shaft SFI is smaller than the specific torque, the relative rotation between the center member and the friction plate is inhibited in the torque limiter TLM. This enables accumulation of the elastic energy in the returning mechanism MDK. When the torque in the forward rotation direction Fwd of the input shaft SFI is equal to or greater than the specific torque, slide between the center member and the friction plate occurs, thereby allowing the relative rotation in the torque limiter TLM. While the input shaft SFI is continuously rotated in the forward rotation direction Fwd at the specific torque or greater, the spiral spring SPR does not become loose. Thus, the specific amount of accumulated elastic energy is maintained in the returning mechanism MDK.

On the other hand, when the electric motor MTR is rotated in the reverse rotation direction Rvs to decrease the braking torque, the input shaft SFI is rotated in the reverse rotation direction Rvs. The spiral spring SPR is then loosened, thereby decreasing the elastic energy accumulated in the returning mechanism MDK. While the elastic energy of the spiral spring SPR is decreased, torque in the reverse rotation direction Rvs is applied from the spiral spring SPR to the input shaft SFI. Thus, the torque is added to the output shaft of the electric motor MTR so that the rotation direction of the output shaft of the electric motor MTR will be returned to the reverse rotation direction Rvs.

When the input shaft SFI is further rotated in the reverse rotation direction Rvs after the elastic energy of the spiral spring SPR is completely released, the end Se1 of the spiral spring SPR is released from the cut section of the torque limiter TLM. This allows relative rotation of the spiral spring SPR to the input shaft SFI.

In accordance with requests for increase and decrease in the braking torque during braking operation, the electric motor MTR rotates in the forward rotation direction Fwd and in the reverse rotation direction Rvs, thereby causing repeated accumulation and release of the elastic energy in the returning mechanism MDK. The above describes operation of the returning mechanism MDK.

Even when a power source (storage battery BAT, generator ALT) of the electric motor MTR malfunctions, and the electric motor MTR is unable to be driven in the reverse rotation direction Rvs, the elastic energy that is accumulated in the spiral spring SPR in the returning mechanism MDK applies torque to the input shaft SFI in the reverse rotation direction Rvs. This torque applies the returning force Frt to the piston PSN in the backward direction. As a result, even when the electric motor MTR is not supplied with electricity, the piston PSN is let to return to the initial position.

<Processing of Controller CTL>

Figure 3:
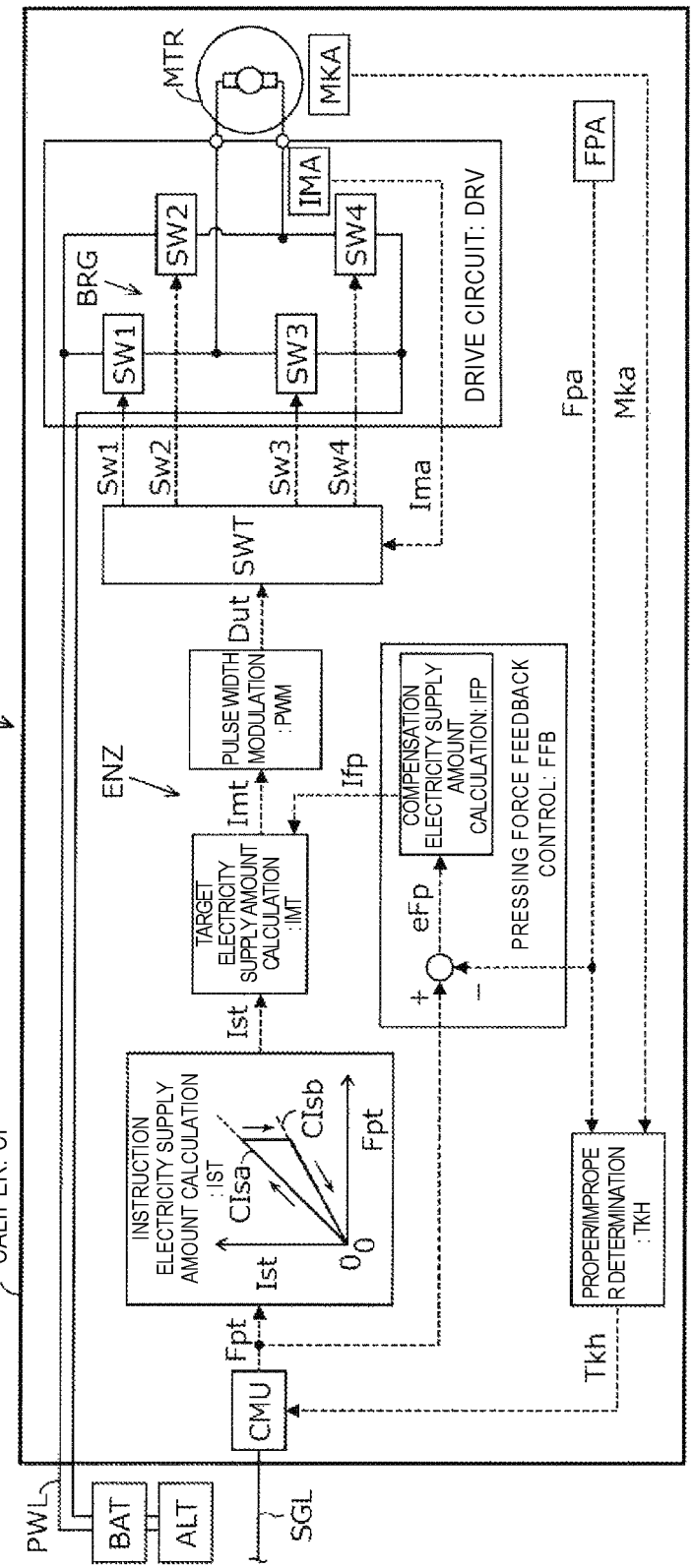
FIG. 3 is a functional block diagram for explaining processing of a controller CTL.

Processing of the wheel-side controller ECW will be described with reference to the functional block diagram in FIG. 3. The wheel-side controller ECW corresponds to a part of the controller CTL. Thus, the controller CTL includes the vehicle body-side controller ECU and the wheel-side controller ECW. As described above, structural members, arithmetic processes, signals, characteristics, and values that are added with the same symbols exhibit the same functions.

The wheel-side controller ECW adjusts the supply condition of electricity (finally adjusts the magnitude and direction of electric current) to the electric motor MTR to control output and the rotation direction of the electric motor MTR, on the basis of the target pressing force Fpt received from the vehicle body-side controller ECU. The wheel-side controller ECW includes the communication unit CMU, the arithmetic unit ENZ, and the drive unit (drive circuit) DRV.

The wheel-side communication unit CMU is connected to the vehicle body-side communication unit CMU of the vehicle body-side controller ECU via the communication line SGL. The communication line SGL uses a serial communication bus (for example, CAN communication). The target pressing force Fpt is sent (transmitted) from the vehicle body-side controller ECU to the wheel-side controller ECW via the communication line SGL. The vehicle body-side communication unit CMU and the wheel-side communication unit CMU perform error detection of data signals (Fpt and other signals) that are received and are sent.

The arithmetic unit ENZ is a control algorithm and is programmed in a microprocessor in the wheel-side controller ECW. The arithmetic unit ENZ includes an instruction electricity supply amount calculation block IST, a pressing force feedback control block FFB, a target electricity supply amount calculation block IMT, a pulse width modulation block PWM, a switching control block SWT, and a proper/improper determination block TKH.

The instruction electricity supply amount calculation block IST calculates an instruction electricity supply amount Ist on the basis of the target pressing force Fpt and preliminarily set arithmetic characteristics (arithmetic map) CIsa and CIsb. The instruction electricity supply amount Ist is a target value of amount of electricity to be supplied to the electric motor MTR to secure the target pressing force Fpt. The arithmetic map of the instruction electricity supply amount Ist is constituted of the two arithmetic characteristics CIsa and CIsb in consideration of hysteresis of the actuator BRK.

The "electricity supply amount" is a quantity of state (variable) for controlling the output torque of the electric motor MTR. The electric motor MTR outputs torque that is approximately proportional to electric current, and therefore, an electric current target value of the electric motor MTR can be used as a target value for the electricity supply amount. In addition, increasing in voltage supplied to the electric motor MTR causes an increase in electricity, and therefore, a supplied voltage value can also be used as the target electricity supply amount. Furthermore, the supplied voltage value can be adjusted by a duty ratio in pulse width modulation, and therefore, the duty ratio can also be used for the electricity supply amount.

The pressing force feedback control block FFB calculates a compensation electricity supply amount Ifp on the basis of the target pressing force (target value) Fpt and an actual pressing force (actual value) Fpa. More specifically, first, a deviation (pressing force deviation) eFp between the target pressing force Fpt and the actual pressing force Fpa is calculated. The compensation electricity supply amount Ifp is calculated under a PID control on the basis of the pressing force deviation eFp by a compensation electricity supply amount calculation block IFP. The instruction electricity supply amount Ist is calculated as a value corresponding to the target pressing force Fpt, but an error may occur between the target pressing force Fpt and the actual pressing force (measured value) Fpa due to variation in efficiency of the actuator BRK. In view of this, the compensation electricity supply amount Ifp is determined to reduce this error. That is, control is performed so that the actual pressing force Fpa (measured value of the pressing force sensor FPA) will coincide with the target pressing force Fpt.

The target electricity supply amount calculation block IMT calculates a target electricity supply amount Imt that is a final target value for the electric motor MTR. The target electricity supply amount calculation block IMT adjusts the instruction electricity supply amount Ist by using the compensation electricity supply amount Ifp and calculates the target electricity supply amount Imt. More specifically, the compensation electricity supply amount Ifp is added to the instruction electricity supply amount Ist, whereby the target electricity supply amount Imt is calculated.

The rotation direction of the electric motor MTR is determined on the basis of the sign of the target electricity supply amount Imt (positive or negative of the value), and the output (rotation power) of the electric motor MTR is controlled on the basis of the magnitude of the target electricity supply amount Imt. More specifically, the electric motor MTR is driven in the forward rotation direction (direction for increasing the pressing force) Fwd in the case in which the sign of the target electricity supply amount Imt is positive (Imt>0), and the electric motor MTR is driven in the reverse rotation direction (direction for decreasing the pressing force) Rvs in the case in which the sign of the target electricity supply amount Imt is negative (Imt<0). Moreover, control is performed so that the output torque of the electric motor MTR will be greater as an absolute value of the target electricity supply amount Imt is greater and will be smaller as the absolute value of the target electricity supply amount Imt is smaller.

The pulse width modulation block PWM calculates an indication value (target value) for performing pulse width modulation, on the basis of the target electricity supply amount Imt. More specifically, the pulse width modulation block PWM determines a duty ratio Dut of the pulse width (ratio of a pulse width in an on-state in a period of a periodical pulse wave), on the basis of the target electricity supply amount Imt and a preliminarily set characteristic (arithmetic map).

The pulse width modulation block PWM also determines the rotation direction of the electric motor MTR on the basis of the sign (positive sign or negative sign) of the target electricity supply amount Imt. For example, the rotation direction of the electric motor MTR is set such that the forward rotation direction Fwd is represented by a positive (plus) value and the reverse direction is represented by a negative (minus) value. The input voltage (power source voltage) and the duty ratio Dut determine a final output voltage, and therefore, the pulse width modulation block PWM determines the rotation direction of the electric motor MTR and the electricity supply amount to the electric motor MTR (that is, output of the electric motor MTR).

Moreover, the pulse width modulation block PWM executes a so-called current feedback control. In this case, a measured value (for example, an actual electric current value) Ima of the electricity supply amount sensor IMA is input to the pulse width modulation block PWM. The duty ratio Dut is corrected (finely adjusted) on the basis of a deviation eIm between the target electricity supply amount Imt and the actual electricity supply amount (measured value of the current sensor IMA) Ima, so that the deviation eIm will approach "0". This current feedback control enables a highly accurate motor control.

The switching control block SWT outputs the drive signals Sw1 to Sw4 to the switching elements SW1 to SW4 constituting the bridge circuit BRG, on the basis of the duty ratio (target value) Dut. The drive signals Sw1 to Sw4 instruct the corresponding switching elements to conduct electricity or to not conduct electricity. As the duty ratio Dut is greater, an electricity supplied time per unit time is made longer, and a greater amount of electricity is supplied to the electric motor MTR.

The drive unit DRV is an electric circuit for driving the electric motor MTR. The drive circuit DRV includes the bridge circuit BRG and the electricity supply amount sensor (electric current sensor) IMA. FIG. 3 illustrates an example of the drive circuit DRV using a motor with a brush (also simply called a "brush motor") as the electric motor MTR.

The bridge circuit BRG changes a direction of electricity supplied to the electric motor MTR by using a single power source without requiring a bidirectional power source and thereby controls the rotation direction (forward rotation direction Fwd and reverse direction) of the electric motor MTR. The bridge circuit BRG includes the switching elements SW1 to SW4. The switching elements SW1 to SW4 turn on (supply electricity to) and turn off (shut off electricity to) parts of the electric circuit. The switching elements SW1 to SW4 are driven by the drive signals Sw1 to Sw4 from the arithmetic unit ENZ. The conduction state and the non-conduction state of each of the switching elements are switched to adjust the rotation direction and the output torque of the electric motor MTR. For example, the switching elements SW1 to SW4 respectively use a MOS-FET or an IGBT.

The electricity supply amount sensor IMA is provided to the bridge circuit BRG. The electricity supply amount sensor IMA measures an electricity supply amount (actual value) Ima of the electric motor MTR. For example, the electricity supply amount sensor IMA may use an electric current sensor IMA. The electric current sensor IMA measures a value of electric current that actually flows to the electric motor MTR, as the actual electricity supply amount Ima.

The electric motor MTR is provided with the rotation angle sensor MKA that obtains (measures) a rotation angle (actual value) Mka of the rotor. The measured rotation angle Mka is input to the wheel-side controller ECW.

The electric motor MTR may use a brushless motor instead of a motor with a brush. The brushless motor includes a permanent magnet for a rotator (rotor) and a winding circuit (electromagnet) for a stationary part (stator). The rotation angle Mka of the rotor is measured by the rotation angle sensor MKA. The switching elements are switched in accordance with the rotation angle Mka, thereby commutating the supply current.

In the case of using the brushless motor, the bridge circuit BRG includes six switching elements. As in the case of the motor with the brush, the conduction state and the non-condition state of the switching elements are controlled on the basis of the duty ratio Dut. The six switching elements constitute a three-phase bridge circuit and are controlled on the basis of an actual rotation angle Mka. The switching elements sequentially switch directions of electricity supply amounts (that is, excitation directions) of a U-phase coil, a V-phase coil, and a W-phase coil of the bridge circuit, and the electric motor MTR is driven accordingly. The rotation direction (forward rotation direction or reverse rotation direction) of the brushless motor is determined by a relationship between the rotor and an excitation position.

The pressing force sensor FPA measures a force (pressing force) Fpa of the piston PSN for pressing the friction member MS. That is, the FPA measures a force for pressing the friction member MS against the rotation member KT. The pressing force sensor FPA is provided between the screw member NJB and the caliper CP. For example, the pressing force sensor FPA is fixed to the caliper CP and measures a reaction force (reaction) received by the piston PSN from the friction member MS, as a pressing force Fpa. The measured pressing force Fpa is input to the wheel-side controller ECW.

The power source of the electric motor MTR includes the storage battery BAT and the generator ALT. The storage battery BAT and the generator ALT are provided on the vehicle body side of the vehicle. The power sources supply electric power to the vehicle body-side controller ECU and the wheel-side controller ECW via power lines PWL. As a result, the electric power to the electric motor MTR is supplied by the storage battery BAT or the generator ALT.

The proper/improper determination block TKH determines whether the returning mechanism MDK operates properly, on the basis of one or both of the rotation angle (measured value) Mka and the pressing force (measured value) Fpa. In the case in which the MKD operates improperly, the proper/improper determination block TKH generates a notification signal Tkh for notifying this result. The notification signal Tkh is then sent to the vehicle body-side controller ECU via the communication line SGL. The vehicle body-side controller ECU notifies a driver through the indicator IND on the basis of the notification signal Tkh. The processing of the proper/improper determination block TKH are described in detail below.

<First Example of Processing of Proper/Improper Determination Block TKH>

Figure 4:
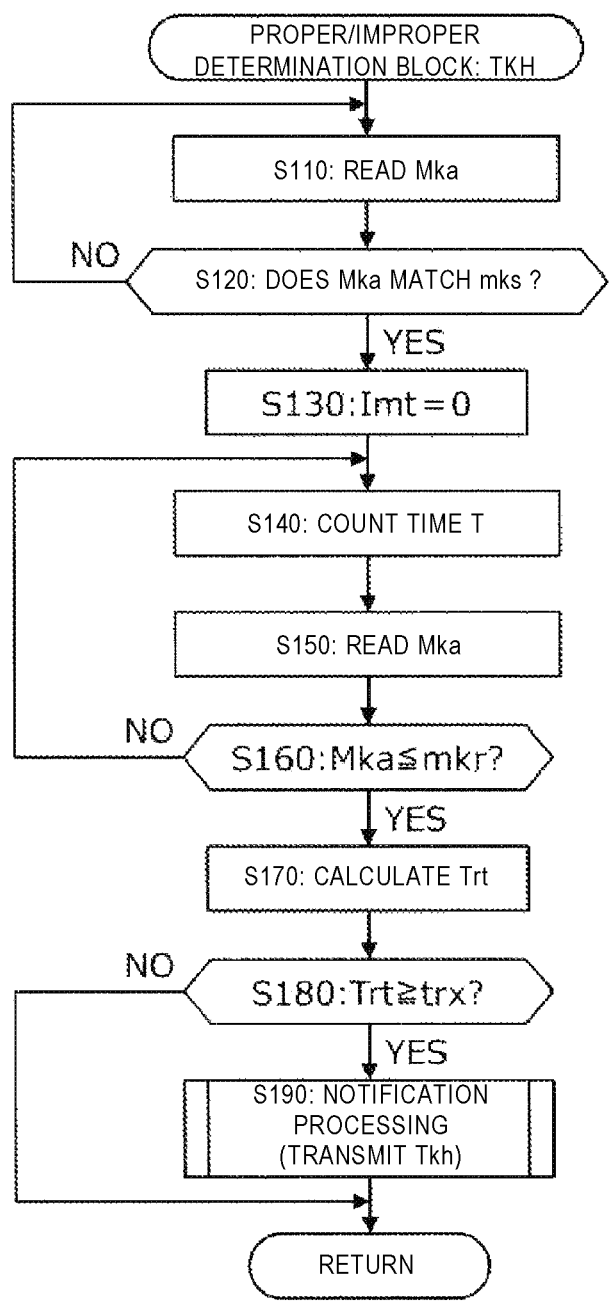
FIG. 4 is a flowchart for explaining a first example of processing of a proper/improper determination block TKH.

A first example of the processing of the proper/improper determination block TKH will be described with reference to the flowchart in FIG. 4. The proper/improper determination block TKH determines whether the fail-safe function of the returning mechanism MDK is in the condition of being able to be exhibited properly. This determination is executed in the case in which a driver finishes operation of the brake operation member (brake pedal) BP and the brake operation member BP is made to return to a non-braking state (that is, in the case in which the operation amount Bpa is decreased to "0").

In step S110, an actual rotation angle (measured value) Mka is read. The rotation angle Mka is measured by the rotation angle sensor MKA provided to the electric motor MTR.

In step S120, "whether the rotation angle Mka comes to coincide with a determination start angle mks" is determined on the basis of the rotation angle Mka. In this case, the word "coincide" represents "coincide completely" but can also represent "coincide approximately". For example, whether the condition "(mks−α)≤Mka≤(mks+α)" is satisfied is determined. The determination start angle mks is a threshold for starting the determination and is a specific value set in advance. For example, the determination start angle mks may be set at a value corresponding to the initial position of the piston PSN. The value a is a preliminarily set specific value (minute value) with a positive sign for specifying a range of the determination start angle mks.

In the case in which the piston PSN is returned to the vicinity of the initial position, and the determination in step S120 is affirmed (in the case of "YES"), the processing advances to step S130. Otherwise, in the case in which the piston PSN is returning to the initial position, and the determination in step S120 is denied (in the case of "NO"), the processing returns to step S110.

In step S130, supply of electricity to the electric motor MTR is stopped. More specifically, the target electricity supply amount Imt is determined to "0". At this time, the stop of the supply of electricity to the electric motor MTR may be checked by referring to the actual electricity supply amount (measured value) Ima.

In step S140, an elapsed time T after the supply of electricity to the electric motor MTR is stopped is counted. That is, time is added up by a timer in the condition in which a start point (T=0) is set at the time when the condition "Imt=0" is determined. In step S150, the rotation angle Mka is read.

In step S160, "whether the rotation angle Mka is equal to or smaller than a determination finish angle mkr" is determined. The determination finish angle mkr is a threshold for finishing the determination and is a specific value set in advance. The determination finish angle mkr has a value corresponding to a position on the reverse rotation direction Rvs side closer than the position corresponding to the determination start angle mks. That is, the position of the piston PSN corresponding to the determination finish angle mkr is separated from the rotation member KT more than the position of the piston PSN corresponding to the determination start angle mks.

In the case in which "Mka>mkr", and the determination in step S160 is denied (in the case of "NO"), the processing returns to step S140. Otherwise, in the case in which "Mka≤mkr", and the determination in step S160 is affirmed (in the case of "YES"), the processing advances to step S170.

In step S170, a required time Trt from the time point of starting counting the elapsed time T (T=0) until the condition in step S160 is satisfied first is determined. The time Trt is called a "(rotation angle) return time".

In step S180, "whether the return time Trt is equal to or greater than a specific time trx" is determined. The specific time (first specific time) trx is a threshold for the proper/improper determination and is a specific value set in advance. In the case in which "Trt<trx", and the determination in step S180 is denied (in the case of "NO"), it is determined that "the returning mechanism MDK operates properly". Thus, the processing is terminated temporarily. Otherwise, in the case in which "Trt≥trx", and the determination in step S160 is affirmed (in the case of "YES"), it is determined that "the returning mechanism MDK operates improperly". Thus, the processing advances to step S170.

In step S190, a process for notifying the malfunction of the returning mechanism MDK is executed. That is, a notification signal Tkh that represents the malfunction of the returning mechanism MDK is sent from the proper/improper determination block TKH to the vehicle body-side controller ECU. This information is notified to a driver by the indicator IND.

The malfunction of the returning mechanism MDK can occur due to causes such as damage to the spiral spring SPR and increase in friction. As described above, in the first example of the processing, the proper/improper determination of operation of the returning mechanism MDK is executed on the basis of change in the rotation angle (measured value) Mka of the electric motor MTR after the supply of electricity to the electric motor MTR is stopped. More specifically, the proper/improper determination is performed on the basis of length of the return time Trt of the rotation angle required from starting stopping the supply of electricity to the electric motor MTR (T=0) until changing the rotation angle Mka from the determination start angle mks to the determination finish angle mkr. The proper/improper determination is performed by using the measured value of the sensor that is already provided to the electric braking device DDS, thereby requiring no additional structural component. This enables a decrease in dimensions and weight and reliably checking the fail-safe function of the returning mechanism MDK, without having to complicate the electric braking device DDS.

<Second Example of Processing of Proper/Improper Determination Block TKH>

Figure 5:
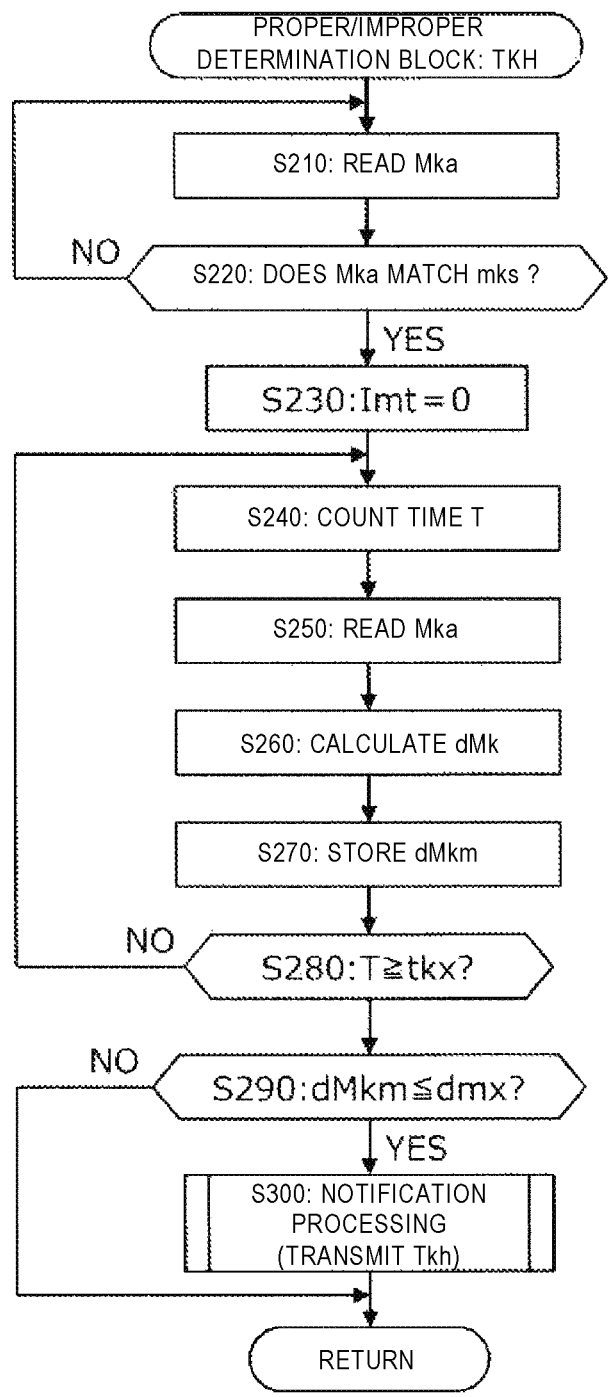
FIG. 5 is a flowchart for explaining a second example of the processing of the proper/improper determination block TKH.

A second example of the processing of the proper/improper determination block TKH will be described with reference to the flowchart in FIG. 5. The proper/improper determination is executed on the basis of the return time (rotation angle return time) Trt required for a predetermined change in the rotation angle Mka in the first example of the processing. On the other hand, the proper/improper determination is performed on the basis of a time variation amount (that is, rotation speed) dMk of the rotation angle Mka in the second example of the processing.

In the second example of the processing, the processing from step S210 to step S250 is the same as in the processing from step S110 to step S150 in the first example of the processing, and therefore, descriptions thereof are not repeated. The processing in step S260, which is different from the processing in the first example is described first.

In step S260, the rotation speed (time variation amount of rotation angle) dMk is calculated on the basis of the rotation angle Mka. More specifically, the rotation angle Mka is differentiated by time, whereby the rotation speed dMk is calculated.

In step S270, a maximum rotation speed dMkm is stored on the basis of the rotation speed dMk. More specifically, "a maximum rotation speed dMkm at a previous calculation period" and a "rotation speed dMk at a current calculation period" are compared with each other. A larger one of the maximum rotation speed dMkm and the rotation speed dMk is stored as a new maximum rotation speed dMkm. That is, in step S270, a maximum value of the rotation speed dMk is stored as the maximum rotation speed dMkm by the series of the processing of the proper/improper determination.

In step S280, on the basis of the elapsed time T that is counted, "whether the elapsed time T is equal to or greater than a determination time tkx" is determined. The determination time tkx is a threshold for the determination and is a specific value set in advance. In the case in which "T<tkx", and the determination in step S280 is denied (in the case of "NO"), the processing returns to step S240. Otherwise, in the case in which "T≥tkx", and the determination in step S280 is affirmed (in the case of "YES"), the processing advances to step S290.

In step S290, on the basis of the maximum rotation speed dMkm, "whether the maximum rotation speed dMkm is equal to or smaller than a specific rotation speed dmx" is determined. In this case, the specific rotation speed dmx is a threshold for the proper/improper determination and is a specific value set in advance. In the case in which "dMkm>dmx", and the determination in step S290 is denied (in the case of "NO"), it is determined that "the returning mechanism MDK operates properly". Thus, the processing is terminated temporarily. Otherwise, in the case in which "dMkm≤dmx", and the determination in step S290 is affirmed (in the case of "YES"), it is determined that "the returning mechanism MDK operates improperly". Thus, the processing advances to step S300.

In step S300, as in the case of step S190, a process for notifying the malfunction of the returning mechanism MDK is executed. More specifically, a notification signal Tkh that represents the malfunction of the returning mechanism MDK is sent to the vehicle body-side controller ECU and is notified to a driver of the malfunction in the electric braking device DDS through the indicator (notification unit) IND.

In the second example of the processing, the maximum rotation speed dMkm is stored during the time from when the stop of the supply of electricity to the electric motor MTR is started (T=0) until when the determination time tkx is passed, by the processing from step S240 to step S280. Then, the proper/improper determination is performed on the basis of the magnitude of the maximum rotation speed dMkm. Thus, also in the second example of the processing, the proper/improper determination of operation of the returning mechanism MDK is executed on the basis of the time change (that is, rotation speed) dMk in the rotation angle Mka of the electric motor MTR after the supply of electricity to the electric motor MTR is stopped.

Effects similar to those in the first example of the processing are obtained in the second example of the processing. That is, the proper/improper determination of the returning mechanism MDK is performed by using the measured value of the sensor that is already provided to the electric braking device DDS. This eliminates the need for an additional structural component, thereby enabling a decrease in dimensions and weight and reliably checking the fail-safe function of the returning mechanism MDK, without having to complicate the electric braking device DDS.

Other Embodiments

The following describes other embodiments. The other embodiments also provide effects similar to those described above (proper/improper determination of the returning mechanism MDK by using the structural component already provided, simplification of the structure of the electric braking device DDS, and reliable checking of operation of the returning mechanism MDK).

In the above-described embodiment, the proper/improper determination of operation of the returning mechanism MDK is executed on the basis of change in the rotation angle Mka. The proper/improper determination of operation of the returning mechanism MDK can also be executed on the basis of the pressing force Fpa instead of or in addition to the rotation angle Mka. That is, the proper/improper determination of operation of the returning mechanism MDK is performed on the basis of one or both of the change in the rotation angle Mka and the change in the pressing force Fpa. In the case in which the proper/improper determination is performed on the basis of the rotation angle Mka and the pressing force Fpa, the notification of malfunction of the device is performed when an improper state is decided in one or both of the two conditions for determining the propriety.

<<Proper/Improper Determination on the Basis of Pressing Force Fpa>>

The processing in the case of using the pressing force Fpa in the proper/improper determination can be described by respectively replacing the words or phrases as follows in the processing described with reference to the flowchart in FIG. 4 or 5. The "rotation angle (measured value) Mka" is replaced with "the pressing force (measured value) Fpa", the "determination start angle (specific value) mks" is replaced with a "determination start force (specific value) fps", the "determination finish angle (specific value) mkr" is replaced with a "determination finish force (specific value) fpr", the "rotation angle return time (measured value) Trt" is replaced with a "pressing force return time (measured value) Trs", the first specific time (specific value) trx" is replaced with a "second specific time (specific value) trz", the "rotation speed (calculated value) dMk" is replaced with a "pressing speed (calculated value) dFp", the "maximum rotation speed (time variation amount of rotation angle) dMkm" is replaced with a "maximum pressing speed (time variation amount of pressing force) dFpm", and the "specific rotation speed (specific value) dmx" is replaced with a "specific pressing speed (specific value) dfx". The following briefly describes this processing.

For example, the proper/improper determination is performed on the basis of length of the pressing force return time Trs required from starting stopping the supply of electricity to the electric motor MTR (T=0) until changing (decreasing) the pressing force Fpa from the determination starting force fps to the determination finish force fpr. The determination start angle mks corresponds to the state in which the clearance between the rotation member KT and the friction member MS is approximately zero. Thus, the pressing force Fpa is basically "0" at the determination start angle mks. In view of this, the position of the piston PSN corresponding to the determination start force fps may be set on the rotation member KT side closer than the position of the piston PSN corresponding to the determination start angle mks. Thus, a pressing force Fpa greater than "0" is measured at the determination start force fps. The determination finish force fpr is set so as to be smaller than the determination start force fps and be equal to or greater than "0" (0≤fpr<fps).

In the case in which the pressing force return time Trs is shorter than the specific time trz, the returning mechanism MDK is determined as operating properly. In the case in which the return time Trs is equal to or greater than the specific time trz, the returning mechanism MDK is determined as malfunctioning. The specific time (second specific time) trz is a threshold for the proper/improper determination and is a specific value set in advance.

The maximum pressing speed dFpm is stored during the time from when the stop of the supply of electricity to the electric motor MTR is started (T=0) until when the determination time tkx is passed, and the proper/improper determination is performed on the basis of the magnitude of the maximum pressing speed dFpm. The maximum pressing speed dFpm is a maximum value of a pressing force time variation amount dFp and is calculated in a process similar to that for the maximum rotation speed dMkm. In the case in which the maximum pressing speed dFpm is greater than the specific pressing speed dfx, the returning mechanism MDK is determined as operating properly. Otherwise, in the case in which the maximum pressing speed dFpm is equal to or smaller than the specific pressing speed dfx, the returning mechanism MDK is determined as malfunctioning. The specific pressing speed dfx is a threshold for the proper/improper determination and is a specific value set in advance. The above describes the proper/improper determination on the basis of the pressing force Fpa.

<<Proper/Improper determination Using Automatic Pressing>>

The proper/improper determination is executed when the brake operation member BP is returned after being operated by a driver, in the above-described embodiments. Alternatively, the proper/improper determination of the returning mechanism MDK may be automatically executed by the electric braking device DDS itself when the brake operation member BP is not operated (that is, in the non-braking state in which "Bpa=0"). More specifically, the electric braking device DDS drives the electric motor MTR in the forward rotation direction Fwd to make the piston PSN advance at least to the position corresponding to the determination start angle mks (or the determination start force fps). The electric braking device DDS then executes one or both of the processings that are described with reference to the flowcharts in FIGS. 4 and 5. This processing is called an "automatic pressing processing".

For example, the automatic pressing processing may be executed when a driver performs acceleration operation. Specifically, an acceleration operation member (for example, an accelerator pedal) is provided with an acceleration operation sensor APA that measures an acceleration operation amount Apa. In the case in which the acceleration operation amount Apa is equal to or greater than a specific amount apx, the automatic pressing processing is executed. The specific amount apx is a threshold for the acceleration operation determination and is a specific value set in advance. The pressing force Fpa is "0" or is a very minute value at the piston PSN position corresponding to the "determination start angle mks or the determination start force fps". Thus, execution of the automatic pressing processing does not affect deceleration of a vehicle, thereby giving no strange feeling to a driver. The above describes the automatic pressing processing.

The returning mechanism MDK is provided to the input shaft SFI that is fixed to the output shaft of the electric motor MTR in the above-described embodiments. Alternatively, the returning mechanism MDK may be provided to the output shaft SFO that is an output part of the speed reducer GSK. That is, the returning mechanism MDK is provided to a rotating structural member in the brake actuator BRK. The returning mechanism MDK uses the spiral spring but may use a coil spring instead of the spiral spring. In this case, the returning mechanism MDK is provided to a structural member (pressing piston PSN or another component) that linearly moves.

The notification signal Tkh is not generated in the case in which the returning mechanism MDK is determined as operating appropriately, in the above-described embodiments. However, in contrast, a notification signal Tkh that represents proper operation of the returning mechanism MDK may be generated. In this case, two kinds of signals, that is, a signal representing "proper operation" and a signal representing "improper operation" are generated as the notification signals Tkh.

The invention claimed is:

1. An electric braking device for a vehicle, configured to generate a braking force at a wheel of the vehicle by making a friction member pressed against a rotation member that rotates integrally with the wheel, via a piston driven by an electric motor, the electric braking device comprising:
   a controller that controls the electric motor;
   a rotation angle sensor that measures a rotation angle of the electric motor; and
   a returning mechanism that applies a returning force to the piston in a direction away from the rotation member,
   wherein the controller is configured to, when there is no braking request by a driver, supply electricity to drive the electric motor until the rotation angle of the electric motor reaches a determination start angle, then stop the supply of electricity to the electric motor, then execute determination whether the returning mechanism operates properly, on a basis of change in the rotation angle of the electric motor, while the supply of electricity to the electric motor remains stopped, and
   wherein, at the determination start angle, a pressing force of the piston against the friction member is zero.

2. An electric braking device for a vehicle, configured to generate a braking force at a wheel of the vehicle by making a friction member pressed against a rotation member that rotates integrally with the wheel, via a piston driven by an electric motor, the electric braking device comprising:
   a controller that controls the electric motor;
   a pressing force sensor that measures a pressing force of the piston against the friction member; and
   a returning mechanism that applies a returning force to the piston in a direction away from the rotation member,
   wherein the controller is configured to, when there is no braking request by a driver, supply electricity to drive the electric motor until the pressing force of the piston against the friction member reaches zero, then stop the supply of electricity to the electric motor, then execute determination whether the returning mechanism operates properly, on a basis of change in the pressing force on the friction member, while the supply of electricity to the electric motor remains stopped.

* * * * *